(12) United States Patent
Memmott

(10) Patent No.: US 8,387,078 B2
(45) Date of Patent: Feb. 26, 2013

(54) DETERMINING THE CONTEXT OF A COMPUTING DEVICE THAT IS POWERED OFF

(75) Inventor: James Lester Memmott, Draper, UT (US)

(73) Assignee: Intel Corporation, Santa Clara, CA (US)

(*) Notice: Subject to any disclaimer, the term of this patent is extended or adjusted under 35 U.S.C. 154(b) by 1461 days.

(21) Appl. No.: 11/863,148

(22) Filed: Sep. 27, 2007

(65) Prior Publication Data

US 2009/0089818 A1    Apr. 2, 2009

(51) Int. Cl.
*G06F 9/44* (2006.01)
*G06F 15/173* (2006.01)
*G06F 1/32* (2006.01)

(52) U.S. Cl. .......................... 719/330; 709/224; 713/324

(58) Field of Classification Search .................. 719/310, 719/330; 709/224; 713/324
See application file for complete search history.

(56) References Cited

U.S. PATENT DOCUMENTS

| | | | | |
|---|---|---|---|---|
| 5,664,118 A * | 9/1997 | Nishigaki et al. | ............ | 710/304 |
| 5,815,652 A * | 9/1998 | Ote et al. | ......................... | 714/31 |
| 6,044,476 A * | 3/2000 | Ote et al. | ......................... | 714/31 |
| 6,112,246 A * | 8/2000 | Horbal et al. | ................. | 709/230 |
| 6,199,180 B1 * | 3/2001 | Ote et al. | ......................... | 714/31 |
| 6,301,514 B1 * | 10/2001 | Canada et al. | ............... | 700/108 |
| 6,553,336 B1 * | 4/2003 | Johnson et al. | ............... | 702/188 |
| 7,034,814 B2 * | 4/2006 | Gong et al. | .................... | 345/211 |
| 7,290,172 B2 * | 10/2007 | First et al. | ....................... | 714/22 |
| 7,336,168 B2 * | 2/2008 | Kates | ....................... | 340/539.18 |

* cited by examiner

*Primary Examiner* — Van Nguyen

(74) *Attorney, Agent, or Firm* — International IP Law Group, P.L.L.C.

(57) ABSTRACT

In some embodiments a remote request is received relating to a context of a computer after the computer has been powered off. A sensor of the computer is turned on to obtain context information of the computer from the sensor. The obtained context information is provided from the computer to a remote device while the computer is still powered off. Other embodiments are described and claimed.

17 Claims, 2 Drawing Sheets

DETERMINING THE CONTEXT OF A COMPUTING DEVICE THAT IS POWERED OFF

TECHNICAL FIELD

The inventions generally relate to determining the context of a computing device.

BACKGROUND

A major barrier to greater Information Technology (IT) efficiency has been removed by Intel® Active Management Technology (Intel AMT). Using built-in platform capabilities and popular third party management and security applications, Intel AMT allows IT users to better discover, heal, and protect their networked computing assets. Intel AMT also includes built-in manageability to provide out-of-band management capabilities. This allows remote healing of systems after Operating System (OS) failures, for example. Further, alerting and event logging help to detect problems quickly and to reduce downtime. Intel AMT also protects networks by proactively blocking incoming threats, containing infected clients before they impact the network, and alerting IT when critical software agents are removed. Intel AMT also helps to protect the network by making it easier to maintain consistent and updated software and virus protection throughout the enterprise.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
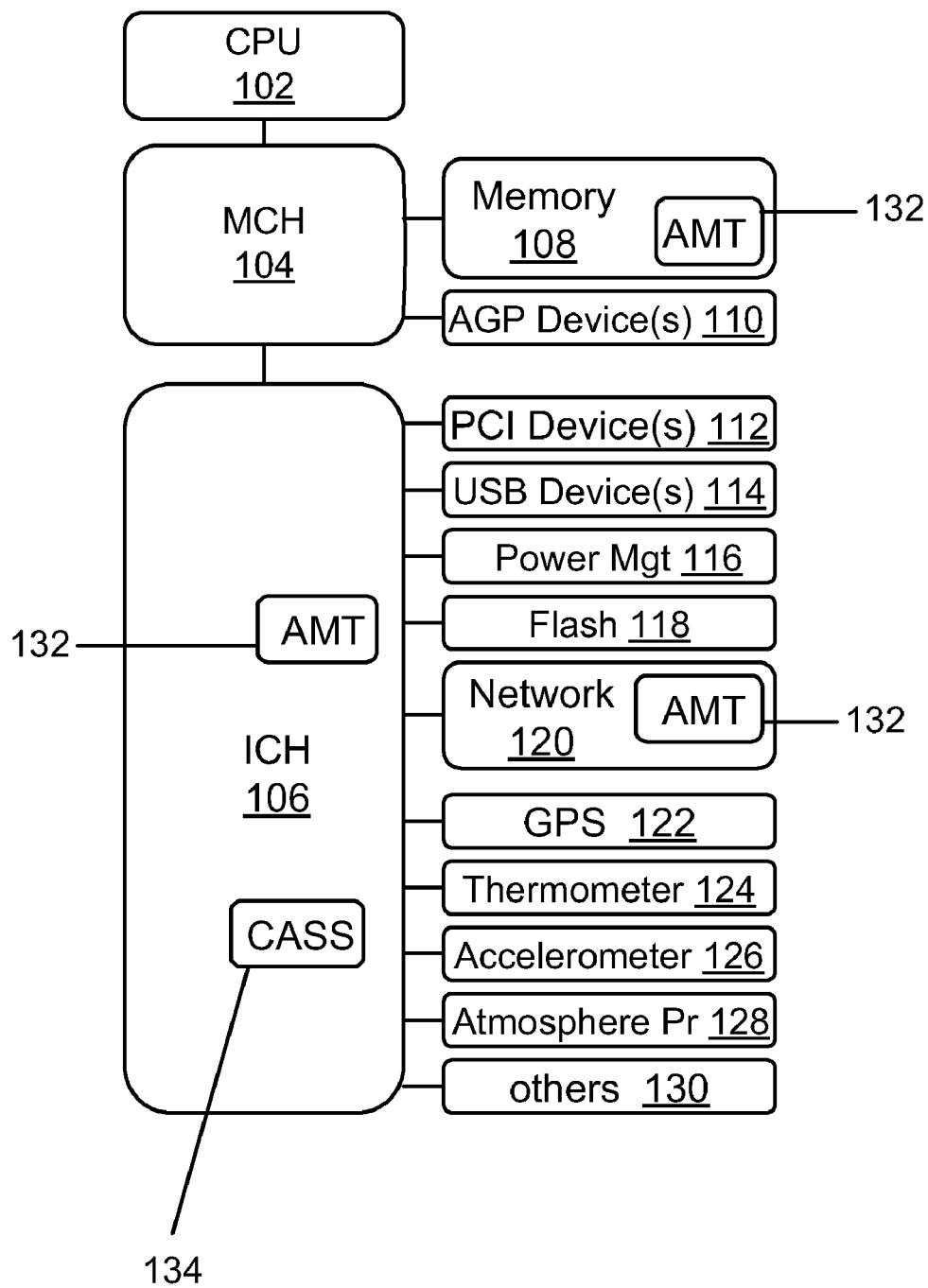
FIG. 1 illustrates a system according to some embodiments of the inventions.

Some embodiments of the inventions relate to determining the context of a computing device.

In some embodiments a remote request is received relating to a context of a computer after the computer has been powered off. A sensor of the computer is turned on to obtain context information of the computer from the sensor. The obtained context information is provided from the computer to a remote device while the overall computer is still powered off (for example, the operating system is powered down).

In some embodiments a context aware circuit receives a remote request relating to a context of a computer after the computer has been powered off. The context aware circuit turns on a sensor of the computer to obtain context information of the computer from the sensor. The context aware circuit also provides the context information to a remote device while the computer is still powered off.

In some embodiments a system includes a sensor and an input/output controller. The input/output controller receives a remote request relating to a context of the system after the system has been powered off, turns on the sensor to obtain context information of the system from the sensor, and provides the context information to a remote device while the system is still powered off.

The computer industry has recently been moving toward "context aware computing". Context aware computing moves the increasingly ubiquitous computing device (for example, desktop, laptop, tablet, personal digital assistant or PDA, Ultra Mobile Device or UMD, and/or smart phone, etc.) to a new level. In some embodiments this can occur by providing awareness to the current computing environment and also to the environment of the user. In response to this awareness according to some embodiments the computer helps the user by providing information that is relevant to the user's current context.

There are several examples of context aware computing that may be implemented according to some embodiments. For example, when a user is working at home a context-aware laptop might show personal information such as personal email, personal desktop, scores from the user's favorite sports teams, etc., and when the user is in the office it might show the user office information such as work email, work desktops, work favorites, company stock ticker, etc. In another example, if a sudden storm arises a context-aware calendaring application notifies the user that 15 additional minutes will be necessary for travel time to the user's next appointment. As another example, when a user moves from office to office (or site to site) a context-aware laptop of the user automatically reconfigures the default printer to the printer that is physically the closest, and may also direct the user to that printer if the user is not familiar with that office. In another example, if a user receives instant messages from the user's spouse, the messages appear without showing the content of the message if someone else is in the user's office or cubicle. In this manner the user can later look at the content when the other person leaves the office or cubicle. Similarly, if the user is alone in their office or cubicle when an instant message is received from the user's spouse that message is automatically shown to the user as it arrives. These examples are meant to be examples of some embodiments, but there are many other examples of the capabilities of such a context-aware platform according to some embodiments.

According to some embodiments context-aware applications may be implemented even when the computer of the user is turned off, in a suspend mode, in a hibernate mode, etc., but another system is interested in knowing about the context of the computer. For example, in some embodiments, a first computing device such as a laptop or other device might include a GPS (Global Positioning System) device, an accelerometer, a thermometer, an atmospheric pressure sensor and/or other context related devices coupled with and/or incorporated into the computing device. In some embodiments, even when the first computing device is turned off, a second computing device such as a PDA (for example, with a different user than the first computing device) can determine the context of the first computing device and the user of that device using sensors within the applications of the first computing device. For example, the second computing device might determine the user's location, travel speed, temperature information, etc., and be able to make a decision based on the information provided from both of the computing devices according to some embodiments.

FIG. 1 illustrates a computer 100 according to some embodiments. In some embodiments computer 100 is a desktop, a laptop, a tablet, a personal digital assistant or PDA, an Ultra Mobile Device or UMD, a smart phone, and/or any other type of computing device. In some embodiments computer 100 includes one or more central processing unit (CPU) 102 (or processor), a memory controller hub (MCH) 104 (or Northbridge), an Input/Output Controller Hub (ICH) 106 (or Southbridge), a memory 108, an Accelerated Graphics Port (AGP) device 110, a Peripheral Component Interconnect (PCI) device 112, a Universal Serial Bus (USB) device 114, a power management controller 116, flash memory 118, a network connection 120, a GPS device 122, a thermometer 124, an accelerometer 126, an atmospheric pressure sensor 128, and/or other sensors 130. Active Management Technology (AMT) 132 such as Intel AMT may be distributed within the ICH 106, the memory 108, the network connection 120, and/or other elements in the system. A context aware subsystem (CASS) 134 may be included, for example, in the ICH 106. In some embodiments, many or all of the elements illustrated in FIG. 1 are resident on a printed circuit board (PCB) such as a motherboard.

A computer system such as computer 100 may include one or more central processing units (CPUs) or processor(s) 102. The CPU(s) 102 may be coupled to a chip set (for example, via a bus). The chipset may include a memory controller hub (MCH) 104 including a memory controller coupled to a system memory such as memory 108. The system memory may store data and/or sequences of instructions that are executed by the CPU(s) or processing device(s) included in the computing system. The MCH may also include, for example, a display controller coupled to a display. The chipset further may include an input/output control hub (ICH) 106 coupled, for example, to the MCH 104 via a hub interface. The ICH 106 may be coupled, for example, to one or more input/output (I/O) devices. The ICH 106 may also be coupled to a peripheral bus (for example, a Peripheral Component Interconnect or PCI bus). A PCI bridge may be coupled to the PCI bus to provide a data path between the CPU(s) and peripheral devices.

With the release of Intel vPro™ technology, new capabilities have been incorporated into computers that actually operate while the system is turned off. For example, Intel AMT, which is a portion of Intel vPro™ technology, keeps part of the motherboard powered even when the computing system is turned off by the user. This small subsystem on the motherboard can respond to a remote request by a management application to do things such as power up the system, install an Operating System (OS) or application patch, etc., and then power the system back down again. AMT 132 of the computer 100 can help to perform these types of operations. AMT 132 allows, among other things, a system to be powered down but still respond to management requests over a network (via network connection 120) to manage the system in this type of manner. In some embodiments, these same capabilities allow for a remote system to obtain context information for the system 100 while the system 100 is still shut down.

According to some embodiments, the AMT 132 and/or CASS 134 may be used to respond to requests to provide context information when the system 100 is powered up. In embodiments where system 100 is a desktop, for example, this is sometimes a feasible option. However, in other embodiments it may not be a feasible option since the system 100 is powered down for some reason (for example, a desktop that has already been powered down, a laptop that has been powered down to converse power, etc.). According to some embodiments, the AMT 132 and/or CASS 134 may be used to respond to requests to provide context information when the system 100 is powered down.

In some embodiments, when system 100 has been powered off by a user, CASS 134 continues to be powered so that it can respond to remote requests over a network (via network connector 120). CASS 134 responds to remote requests that come in over the network connection 120 via the AMT subsystem 132. The CASS 134 turns sensors such as sensors 122, 124, 126, 128, and/or 130 on and off as needed to collect context information for the system 100 and returns the collected context information to the requesting computer, for example, via AMT 132 and/or network connection 120. As a result, authorized remote systems (for example, a PDA, a remote management system, and/or any other type of computing device) can obtain information about the context of the system 100 even when it is powered down, and the remote system can use that obtained information to provide context information to its own application and/or for other uses such as system inventory, for example.

As discussed above, CASS 134 continues to be powered even when the system 100 is powered down. This enables CASS 134 to respond to remote requests made, for example, over a network. Sensors 122, 124, 126, 128, and/or 130 allow the CASS to help the system 100 to determine its context. In some embodiments, sensors 122, 124, 126, 128, and/or 130 are typically turned off in order to conserve power unless a request comes through the CASS 134 to turn on or more of these sensors on in order to take a measurement, for example.

In some embodiments AMT 132 allows, among other things, the system 100 to be powered down but still respond to management requests over the network to manage the system. CASS 134 allows further capabilities of a remote system to obtain context information relating to system 100. In some embodiments CASS 134 is logic added to the ICH 106 that allows the system 100 to respond to remote requests for context information. In some embodiments, these remote requests may be made over the AMT 132 network stack. In some embodiments, CASS 134 turns on one or more or all of the GPS sensor 122, the thermometer 124, the accelerometer 126, the atmospheric pressure sensor 128, and/or other sensors 130 to take readings of the context and/or environment of the system. The CASS 134 is also able to turn those sensors off after the readings are taken in order to conserve power. In some embodiments GPS 122 is a Global Positioning System device used to obtain location information such as, for example, latitude, longitude, and/or altitude of the system 100. In some embodiments thermometer 124 is a sensor to determine an ambient temperature of the location of the system 100. In some embodiments accelerometer 126 is a sensor to determine a direction of travel and an acceleration of the direction of travel of the system 100. This can allow, for example, a determination of the speed of the system, for example. In some embodiments the atmospheric pressure gauge 128 is a sensor used to determine an atmospheric pressure around the system 100. This information may be used, for example, to track and predict weather patterns and/or to estimate the altitude of the system 100. In some embodiments, the other sensors 130 may be one or more sensors that perform functions such as, for example, detecting a presence of the user near the system 100, detecting presence of other people near the system 100, detecting body temperature(s), and/or detecting humidity levels, etc.

Figure 2:
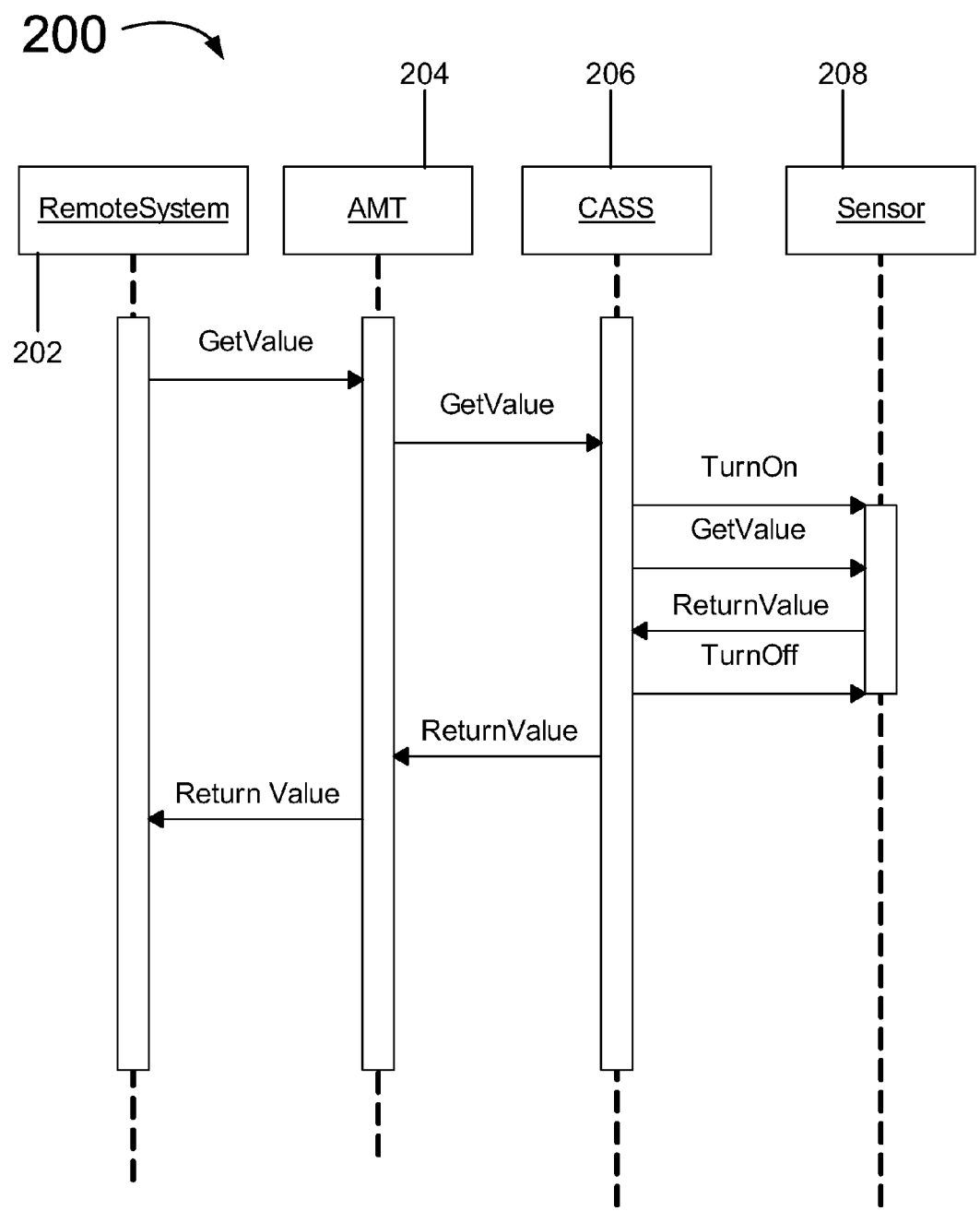
FIG. 2 illustrates a sequence diagram according to some embodiments of the inventions.

FIG. 2 illustrates a sequence diagram 200 of an exemplary remote request between a remote system 202, an AMT 204, a CASS 206, and/or a sensor 208. Sensor 208 may be any sensor such as but not limited to sensors 122, 124, 126, 128, and/or 130 of FIG. 1, for example.

In the sequence diagram 200, a request to get a value is made from the remote system 202 to the AMT 204. The AMT 204 passes the request along to the CASS 206, and the CASS 206 then turns on the sensor 208. Then the CASS 206 passes a request along to the sensor 208 to obtain a value from the sensor (for example, a location value in embodiments where sensor 208 is a GPS device). The value is then returned from the sensor 208 to the CASS 206 and the CASS then turns off the sensor 208. The value is then returned from the CASS 206 to the AMT 204, and passed along to the remote system 202. While FIG. 2 illustrates a single sensor 208, in some embodiments the get value request may be a request for several values that are requested at once and obtained by the CASS 206 at the same time from several sensors 208. In some embodiments, the functions performed in the sequence diagram 200 are performed while a system including the AMT 204, the CASS 206, and/or the sensor 208 is turned off with system power only being supplied to some or all of the AMT 204, the CASS 206, and/or the sensor 208. In some embodiments all elements of FIG. 1 and/or FIG. 2 may not be necessary. For example, in some embodiments, the CASS may be implemented without the AMT, and/or in some embodiments the AMT and the CASS may be included in one device, unit, logic, hardware, and/or software, etc.

In some embodiments the terms "context" and/or "environment" have been used. It is noted that according to some embodiments these terms may be the same and/or may be subsets of each other. Each term as used herein is intended to broadly encompass sensing of various conditions at and/or surrounding a system, computing device, and/or computer, etc.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   receiving, by a context aware circuit, a remote request from a remote device, the remote request relating to a context of a computer after the computer has been powered off;
   turning on, by the context aware circuit, a sensor of the computer to obtain context information of the computer from the sensor; and
   providing, by the context aware circuit, the obtained context information from the computer to the remote device while the computer is still powered off,
   wherein the context aware circuit continues to be powered so that the context aware circuit can respond to the remote request over a network, and
   wherein the context aware circuit turns the sensor off after the context information has been obtained from the sensor.

2. The method of claim 1, wherein the context information includes one or more of location, latitude, longitude, altitude, temperature, direction, acceleration, speed, pressure, presence of a user, presence of others than a user, presence of one or more persons, body temperature, and humidity.

3. The method of claim 1, wherein the context information includes any type of information that sensed at or near the computer.

4. The method of claim 1, comprising displaying information of the computer that is associated with the context.

5. The method of claim 4, wherein the context indicates the computer is located in a home environment, and wherein the displayed information comprises personal information.

6. The method of claim 4, wherein the context indicates the computer is located in an office environment, and wherein the displayed information comprises office information.

7. The method of claim 1, comprising configuring the computer to print to a printer based on a location of the computer, wherein the context indicates the location.

8. The method of claim 1, comprising receiving the remote request from a computing device located remotely in relation to the computer.

9. An apparatus including at least one processor comprising:
   a context aware circuit, the context aware circuit is configured to:
      receive a remote request from a remote device, the remote request relating to a context of a computer after the computer has been powered off;
      turn on a sensor of the computer to obtain context information of the computer from the sensor; and
      provide the context information to the remote device while the computer is still powered off,
   wherein the context aware circuit continues to be powered so that the context aware circuit can respond to the remote request over a network, and
   wherein the context aware circuit turns the sensor off after the context information has been obtained from the sensor.

10. The apparatus of claim 9, wherein the context information includes one or more of location, latitude, longitude, altitude, temperature, direction, acceleration, speed, pressure, presence of a user, presence of others than a user, presence of one or more persons, body temperature, and humidity.

11. The apparatus of claim 9, wherein the context information includes any type of information that sensed at or near the computer.

12. The apparatus of claim 9, wherein the context aware circuit is included in an input/output controller.

13. The apparatus of claim 9, further comprising an active management technology device to interact between the remote device and the context aware circuit.

14. A system including at least one processor comprising:
   a sensor; and
   an input/output controller includes a context aware circuit, the context aware circuit is configured to:
      receive a remote request from a remote device, the remote request relating to a context of a computer after the computer has been powered off;
      turn on a sensor of the computer to obtain context information of the computer from the sensor; and
      provide the context information to the remote device while the computer is still powered off,
   wherein the context aware circuit continues to be powered so that the context aware circuit can respond to the remote request over a network, and
   wherein the context aware circuit turns the sensor off after the context information has been obtained from the sensor.

15. The system of claim 14, wherein the sensor is a sensor of one or more of location, latitude, longitude, altitude, temperature, direction, acceleration, speed, pressure, presence of a user, presence of others than a user, presence of one or more persons, body temperature, and humidity.

16. The system of claim 14, wherein the sensor is a sensor that is able to sense any type of information at or near the computer.

17. The system of claim 14, wherein the input/output controller further includes an active management technology device to interact between the remote device and the sensor.

* * * * *